Jan. 14, 1964     L. E. MYLTING     3,117,821
APPARATUS FOR CONVEYING POWDERED MATERIALS
Filed Feb. 6, 1962     2 Sheets-Sheet 1
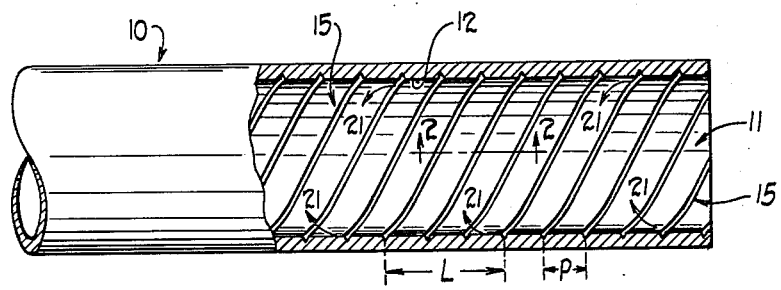
Fig. 1
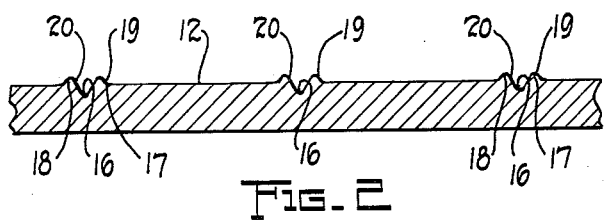
Fig. 2
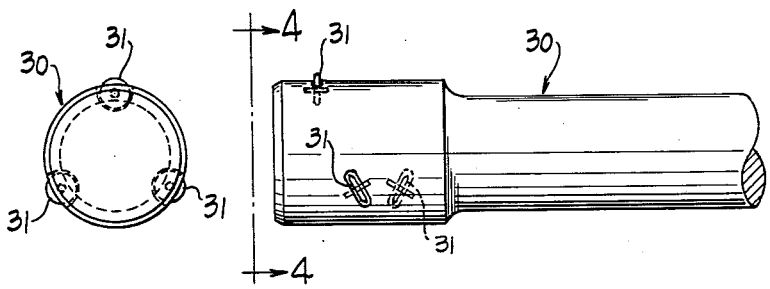
Fig. 4     Fig. 3
INVENTOR.
LAURITZ E. MYLTING
BY 
ATTORNEYS.

Jan. 14, 1964 L. E. MYLTING 3,117,821
APPARATUS FOR CONVEYING POWDERED MATERIALS
Filed Feb. 6, 1962 2 Sheets-Sheet 2
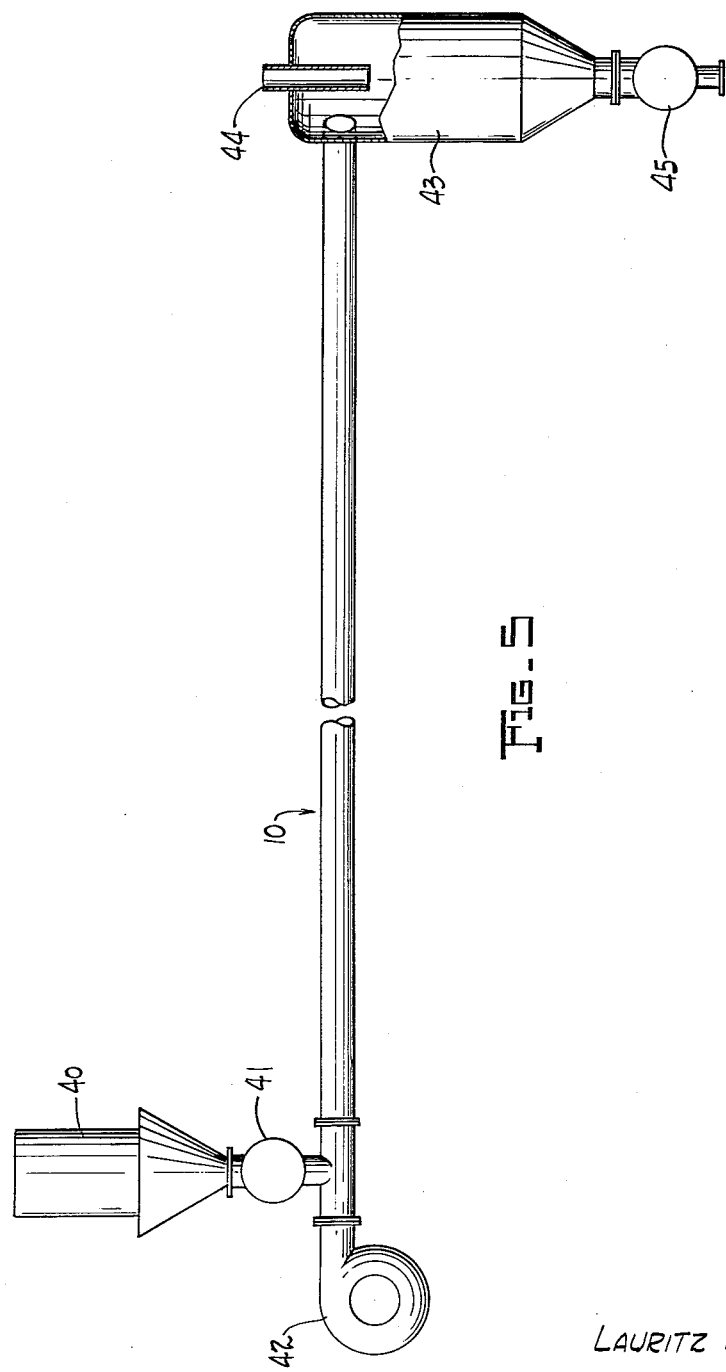
INVENTOR.
LAURITZ E. MYTLING
BY
Watts + Fisher
ATTORNEYS United States Patent Office 3,117,821
Patented Jan. 14, 1964

3,117,821
APPARATUS FOR CONVEYING POWDERED
MATERIALS
Lauritz E. Mylting, Ardmore, Pa., assignor to
A-S-H Industries, Inc.
Filed Feb. 6, 1962, Ser. No. 171,469
4 Claims. (Cl. 302—64)

This invention relates generally to the art of material handling, and more particularly to improvements in apparatus for pneumatically conveying powdered, relatively soft materials, such as polyethylene and the like.

In present day manufacturing processes involving the use of particulate raw materials such as polyethylene, it is frequently desirable automatically to convey the material through the plant, as from storage bins to molding equipment. One way which has been proposed for accomplishing this operation has been to blow or suck the particulate polyethylene through pipes or conduits of pneumatic conveyors. However, the practical use of pneumatic conveyors has been limited by the tendency of polyethylene to smear along the walls of the conduits and form thin skins or streamers which may subsequently peel away in large pieces and clog the conduits and/or the molding equipment.

Prior attempts have been made to avoid the smearing and skin forming tendency of polyethylene in pneumatic conveying systems; however, so far as I am aware, none of these attempts has been particularly successful. For example, it has been proposed to sandblast the interiors of the conduits and/or to form the inside walls with spaced, annular ribs. These conventional techniques are based on the theory that the roughened sidewalls of the conduit will inhibit the flow of the polyethylene particles and thus reduce their velocity to such an extent that smearing is not possible. However, it will be seen that, to the extent such flow inhibiting techniques are effective, the induced low velocity of the polyethylene material is directly opposed to the practical and economical aspect of conveying large quantities at high, constant flow rates.

The present invention aims to overcome the problems associated with pneumatically conveying particulate polyethylene and similar materials and achieves this aim by a new and improved conduit structure. The preferred construction of the conduit contemplated by the invention includes a helical generation on the inside wall surfaces that continually works the polyethylene particles away from the conduit walls into the axially flowing stream. In this manner, the polyethylene is effectively prevented from smearing and forming objectionable skins or streamers.

In addition to the advantage of effecting a marked decrease in the formation of smears and skins, the invention provides a system for pneumatically conveying polyethylene in a highly practical and efficient manner. The velocity of the particulate material is not significantly reduced by the novel helical generation and, in many instances, may be increased. Moreover, the stream of polyethylene particles is advantageously delivered from the mouth of the conduit at a substantially uniform flow rate.

According to another aspect of the invention, there is contemplated both a method and apparatus for generating the helical formation on the conduit walls. The important advantage afforded by this aspect of the invention is the provision of a conduit construction that is relatively inexpensive ts compared to many prior art developments, such as the above-discussed annular rib structure.

The present invention will be better understood by those skilled in the art by reference to the drawing which accompanies and forms a part of this specification and in which:

FIGURE 1 is a fragmentary, cross-sectional view of a conduit made according to the invention;
FIGURE 2 is an enlarged, fragmentary cross-sectional view taken on the line 2—2 of FIG. 1;
FIGURE 3 is a fragmentary view showing apparatus for forming the helical generation;
FIGURE 4 is an end elevational view taken on the line 4—4 of FIG. 3; and
FIGURE 5 is a view schematically illustrating a typical low pressure pneumatic conveyor system embodying the present invention.

Referring first to FIG. 1, there is shown a section 10 of a conduit that may be employed as part of a low pressure or suction type pneumatic conveying system, such as hereinafter described. The details of such a system are known to those skilled in the art and form no part of the present invention. However, it will be recognized that suitable means are associated with the conduit for dispersing particles of polyethylene in an air stream that is confined by the conduit for axial flow, as, for example, in the direction of arrow 11.

According to the present invention the particles of polyethylene are continually worked away from the sidewalls 12 of the conduit 10 by an internal, helical generation that is generally designated by reference numeral 15. As will become more apparent, this helical generation 15 is also effective to maintain a substantially uniform flow rate of the particles across the conduit, while preventing the particles from smearing on the sidewalls.

The preferred form of the helical generation is most clearly illustrated in FIG. 2. As there shown, the helical generation includes a constant pitch groove 16 formed in the sidewalls 12. This groove 16 is relatively shallow as compared to the thickness of the sidewalls. The helical generation 15 further includes an upstream ridge 17 and a downstream ridge 18 along the edges of the groove 16.

The groove 16 and the upstream ridge 17 present surfaces 19 and 20, respectively, for deflecting the particles of polyethylene away from the sidewalls 12. Thus, as indicated by the arrows 21 in FIG. 1, the particles of polyethylene that would otherwise have a tendency to smear along the sidewalls are continually moved toward axis of the conduit 10 and in the downstream direction 11 of axial flow. It is this disposition and action of the surfaces 19 and 21 which is believed effective to maintain the substantially uniform flow rate across the conduit while simultaneously avoiding the tendency of the particles to smear.

Referring now to FIG. 3, there is illustrated a preferred apparatus and technique for generating the helical formation 15. In accordance with this aspect of the invention, the groove 16 is generated in the manner of a triple-thread. That is to say, the lead L (FIG. 1), or the distance the groove 16 advances axially of the conduit 10 in one turn, is made three times the pitch p. This triple groove formation advantageously interrupts the sidewalls 12 at closely spaced intervals axially of the conduit so that the polyethylene particles are continually worked away from the sidewalls in the manner described above. At the same time, the formation 15 may be generated on a relatively large helix angle so that the particles will be deflected by the surfaces 19 and 20 in a downstream direction to maintain a substantially uniform flow rate. This advantageous, continuing downstream movement of the particles may be readily contrasted from the particle blocking and velocity decreasing action achieved with the conventional sandblasted and/or annular rib conduit construction described above.

The foregoing triple-groove formation and the contiguous ridges 17 and 18 may be economically formed with the device 30 which is relatively rotatable and axially movable through the conduit 10. This device 30 is shown as including three tools 31 which are angularly disposed at 120° from each other and are axially spaced apart a distance equal to the pitch $p$.

Each of the tools 31 are constructed to flow the metal of the conduit when forming the groove 16 instead of cutting the metal. This flowing action causes the metal to be pushed to either side of the groove 16 simultaneously to form the ridges 17 and 18. As will be recognized by those familiar with metal working techniques, rollers are well suited for use as the tools 31.

A conduit 10 of the invention is illustrated in FIG. 5 as part of a typical low pressure pneumatic conveyor system, such as generally described above. In this system the polyethylene particles are supplied to the conduit 10 from a bin 40 by a suitable feeder 41. A conveying air stream is generated in the system by a centrifugal blower 42 so that the particles are blown through the conduit to a collector 43. As shown, the air stream enters the collector tangentially and is there exhausted through a pipe 44. The polyethylene material is discharged from the bottom of the collector through a feeder 45 which may be associated with molding equipment or the like.

Because of the new and improved conduit construction 10, smearing or ribbanding of the polyethylene particles along the walls of the conduit, and the consequent formation of skins or streamers, is prevented as the material is conveyed through the system to the collector 43. Instead, the polyethylene is conveyed into the collector in its original particulate form so that the material can be fed from the collector to molding or extrusion equipment, or to bins and hoppers, or the like. By way of contrast, the development of skins or streamers in the conventional conveying systems which have used smooth pipe or, occasionally, sandblasted pipe, has been fatal to the successful handling of polyethylene material. In practice, these skins which are developed in conventional systems quickly clog the pipes after a short time and require the system to be shut down and cleaned out. When the skins are developed, they also clog the collectors, feeders, and associated equipment.

Having thus described the present invention so that others skilled in the art may be able to understand and practice the same, I state what I desire to secure by Letters Patent is defined in what is claimed.

What is claimed is:

1. In a pneumatic conveying system including a conduit, means for generating a conveying air stream through said conduit, and means to disperse particles of polyethylene in said air stream, the improvement comprising an internal, constant pitch helical generation formed along the inner wall surface of said conduit, said generation including groove means interrupting the continuity of said wall surface to prevent smearing of said particles, and ridge means extending along said groove means sloping axially inwardly of said conduit toward its downstream end for deflecting said particles away from the side walls of said conduit, said helical groove generation being formed on a sufficiently large helix angle so that said particles are deflected away from said walls without a significant decrease in velocity.

2. The structure as claimed in claim 1 wherein the lead of said helical generation is greater than its pitch.

3. In a pneumatic conveying system including a conduit, means for generating a conveying air stream through said conduit, and means to disperse particles of polyethylene in said air stream, the improvement comprising an internal, helical generation formed on the side walls of said conduit for continually working said particles away from said sidewalls, said helical generation including a groove and an upstream and downstream ridge along the edges of said groove, said groove and said upstream ridge presenting surfaces sloping axially inwardly of said conduit for deflecting said particles toward the axis of said conduit and in the downstream direction of axial flow so that said particles are prevented from smearing on said sidewalls.

4. In a pneumatic conveying system including a conduit, and means to maintain a flow of particles of polyethylene dispersed in a flowing stream of air, confined by said conduit, the improvement comprising an internal, helical generation on the sidewalls of said conduit for preventing the particles of polyethylene from smearing on said sidewalls, said helical generation comprising a triple-groove formation interrupting said sidewalls at closely spaced intervals axially of said conduit, an upstream ridge and a downstream ridge along the edges of said groove formation, cooperating particle-deflecting surfaces presented by said groove formation and said upstream ridge sloping inwardly of said conduit in a downstream direction for continually working said particles away from said sidewalls, and said groove formation being generated on a sufficiently large helix angle to cause said particles to be deflected in a downstream direction as they are continually worked away from said sidewalls.

References Cited in the file of this patent

UNITED STATES PATENTS

| | | |
|---|---|---|
| 356,888 | Pfeiffer | Feb. 1, 1887 |
| 759,374 | Isaacs | May 10, 1904 |
| 1,263,340 | Silk | Apr. 16, 1918 |
| 1,777,782 | Bundy | Oct. 7, 1930 |
| 2,763,516 | Brooke | Sept. 18, 1956 |
| 2,784,038 | Schneider | Mar. 5, 1957 |